(12) United States Patent
Edwards (10) Patent No.: US 10,608,962 B2
(45) Date of Patent: Mar. 31, 2020

(54) COALESCING MESSAGE TRANSMISSIONS ACROSS A NETWORK

(71) Applicant: Silver Spring Networks, Inc., San Jose, CA (US)

(72) Inventor: Bruce Edwards, San Jose, CA (US)

(73) Assignee: Itron Networked Solutions, Inc., Liberty Lake, WA (US)

(*) Notice: Subject to any disclaimer, the term of this patent is extended or adjusted under 35 U.S.C. 154(b) by 70 days.

(21) Appl. No.: 15/605,757

(22) Filed: May 25, 2017

(65) Prior Publication Data

US 2018/0063037 A1    Mar. 1, 2018

Related U.S. Application Data

(60) Provisional application No. 62/385,163, filed on Sep. 8, 2016, provisional application No. 62/379,678, filed on Aug. 25, 2016.

(51) Int. Cl.
| | |
|---|---|
| H04L 12/861 | (2013.01) |
| H04L 12/933 | (2013.01) |
| H04L 12/931 | (2013.01) |
| H04W 56/00 | (2009.01) |
| H04W 72/00 | (2009.01) |
| H04L 5/00 | (2006.01) |

(52) U.S. Cl.
CPC ...... *H04L 49/9005* (2013.01); *H04L 49/1584* (2013.01); *H04L 49/505* (2013.01); *H04W 56/002* (2013.01); *H04W 72/005* (2013.01); *H04L 5/0053* (2013.01); *H04L 5/0055* (2013.01)

(58) Field of Classification Search
CPC ..... H04W 36/20; H04W 36/22; H04W 36/32; H04W 48/20; H04W 4/04; Y02D 70/1262
See application file for complete search history.

(56) References Cited

U.S. PATENT DOCUMENTS

| | | | |
|---|---|---|---|
| 6,388,989 B1 | 5/2002 | Malhotra | |
| 2006/0056423 A1 | 3/2006 | Ratiu et al. | |
| 2013/0064159 A1 | 3/2013 | Edwards | |
| 2015/0181561 A1* | 6/2015 | Oh | H04L 1/1861 370/336 |
| 2015/0256401 A1* | 9/2015 | Zinger | H04L 41/14 370/401 |

FOREIGN PATENT DOCUMENTS

WO    2015/142909 A1    9/2015

OTHER PUBLICATIONS

International Search Report and Written Opinion for International Application No. PCT/US2017/047032 dated Oct. 31, 2017, 8 pages.

* cited by examiner

*Primary Examiner* — Ayaz R Sheikh
*Assistant Examiner* — Debebe A Asefa
(74) *Attorney, Agent, or Firm* — Artegis Law Group, LLP (57) ABSTRACT

A node in network is configured to buffer data received from other nodes across multiple channels. The node process a portion of the buffered data associated with a subset of those channels. When the node receives data on that subset of channels that includes a notification, the node then processes a larger portion of the buffered data associated with a larger number of channels. In doing so, the node may identify additional notifications include within data that was buffered but not previously processed. The node may also coordinate with other nodes in order to process buffered data upon identification of a notification.

19 Claims, 6 Drawing Sheets

COALESCING MESSAGE TRANSMISSIONS ACROSS A NETWORK

CROSS-REFERENCE TO RELATED APPLICATIONS

This application claims priority benefit of U.S. provisional patent application titled "EXTENDED LAST GASPS", filed on Sep. 8, 2016 and having Application No. 62/385,163 and also claims priority benefit of U.S. provisional patent application titled "EXTENDED LAST GASPS", filed on Aug. 25, 2016 and having Application No. 62/379,678. The subject matter of these related applications is hereby incorporated herein by reference.

BACKGROUND OF THE INVENTION

Field of the Invention

Embodiments of the present invention relate generally to wireless network communications and, more specifically, to coalescing message transmissions across a mesh network.

Description of the Related Art

A conventional wireless mesh network includes a plurality of nodes configured to communicate with one another via wireless communication links. Each node also is configured to communicate, either directly or indirectly, with one or more access points coupled to the network. An access point acts as a gateway into and out of the mesh network, allowing nodes to communicate with one or more network management entities residing outside the mesh network.

Under various circumstances, multiple nodes may simultaneously transmit messages across the network to an access point in order to communicate with one of the network management entities. For example, if a power outage occurs, nodes could transmit "last gasp" messages to one of the network management entities, via a given access point, to indicate that those nodes have lost power. In such a situation, a large number of nodes could lose power at approximately the same time; therefore, all of those nodes could transmit "last gasp" messages to the access point within a very short time interval. In another example, a given network management entity could broadcast a message to some or all nodes in the mesh network. Upon receiving the broadcast message, the nodes could transmit acknowledgement messages to the network management entity via a given access point. In this scenario, the access point would receive a large number of acknowledgement messages within a very short time interval.

In either of the above examples, and other similar scenarios, the access point may become flooded with numerous messages within a very short time span. The access point may not be capable of processing all such incoming messages quickly enough and, consequently, may become overwhelmed with message-oriented traffic. In extreme cases, the access point may cease to function properly, potentially disabling the mesh network.

As the foregoing illustrates, what is needed in the art is a more effective approach for transmitting messages across a mesh network.

SUMMARY OF THE INVENTION

One embodiment of the present invention sets forth a computer-implemented method for for transmitting data across a mesh network, the method comprising receiving a first message from a first node that resides within a first portion of the mesh network, receiving a second message from a second node that resides within the first portion of the mesh network, combining the first message and the second message to generate a third message, and transmitting the third message to an access point or a third node residing in a different portion of the mesh network.

At least one advantage of the technique described herein is that coalescing messages reduces the amount of traffic across the wireless mesh network, thereby conserving bandwidth.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
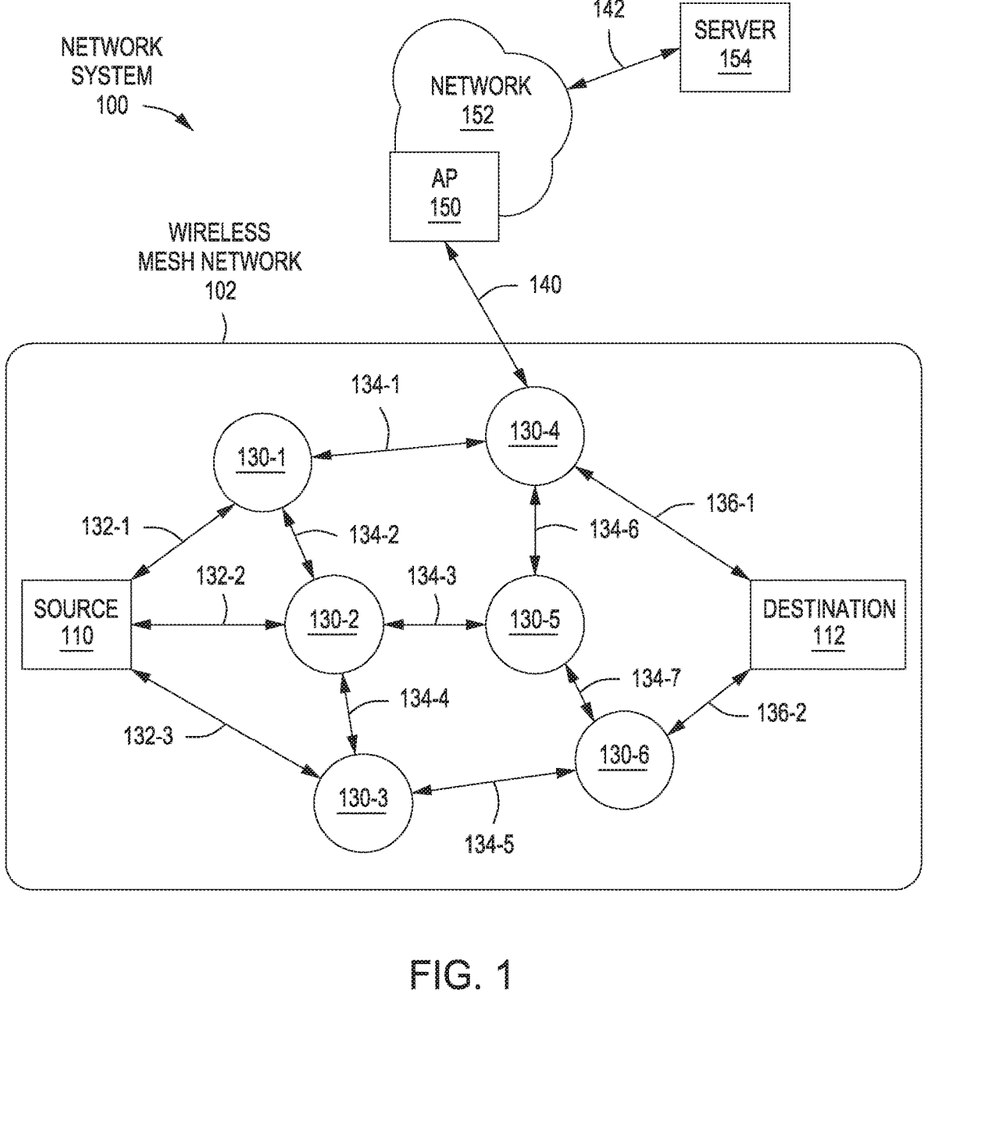
FIG. 1 illustrates a network system configured to implement one or more aspects of the present invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 is computing device, including a processor and memory, and executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
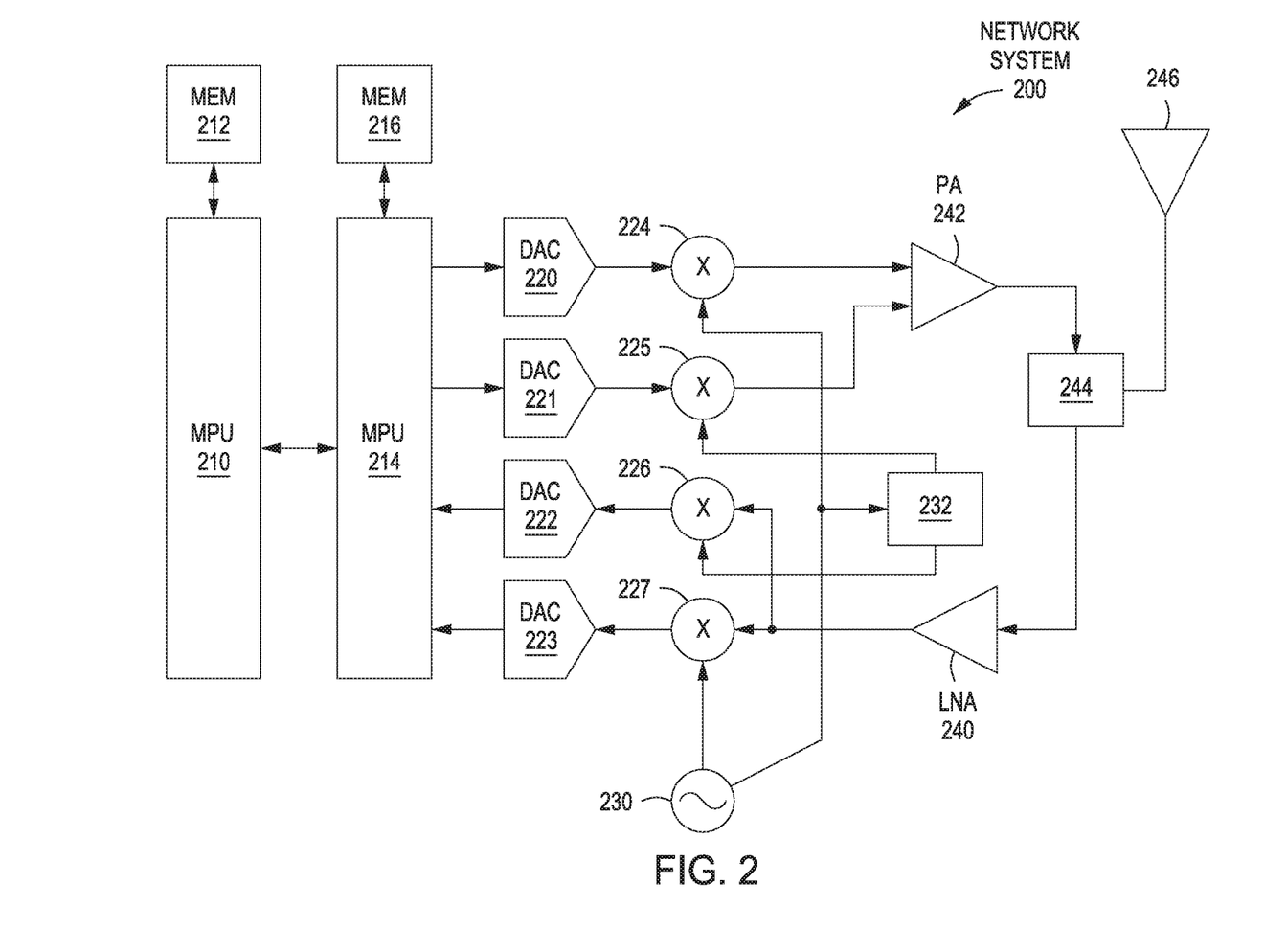
FIG. 2 illustrates a network interface configured to transmit and receive data within the mesh network of FIG. 1, according to various embodiments of the present invention.

FIG. 2 illustrates a network interface configured to transmit and receive data within the mesh network of FIG. 1, according to various embodiments of the present invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3A-5, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or MPU 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or MPU 214 may buffer within memory 212 and/or memory 216 any portion of data received across the set of channels from which antenna 246 receives data, including all such data. MPU 210 and/or MPU 214 may then perform various operations with the buffered data, including demodulation operations, decoding operations, and so forth.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring back now to FIG. 1, under various circumstances, nodes 130 may transmit messages to server 154 that reflect various operating conditions associated with those nodes 130. The operating conditions associated with a given node 130 could include, for example, a set of environmental conditions and/or events detected by the node 130, status information associated with the portion of the wireless mesh network 202 to which the node 130 is coupled, and status information associated with a utility grid the node 130 is configured to monitor.

Figure 3:
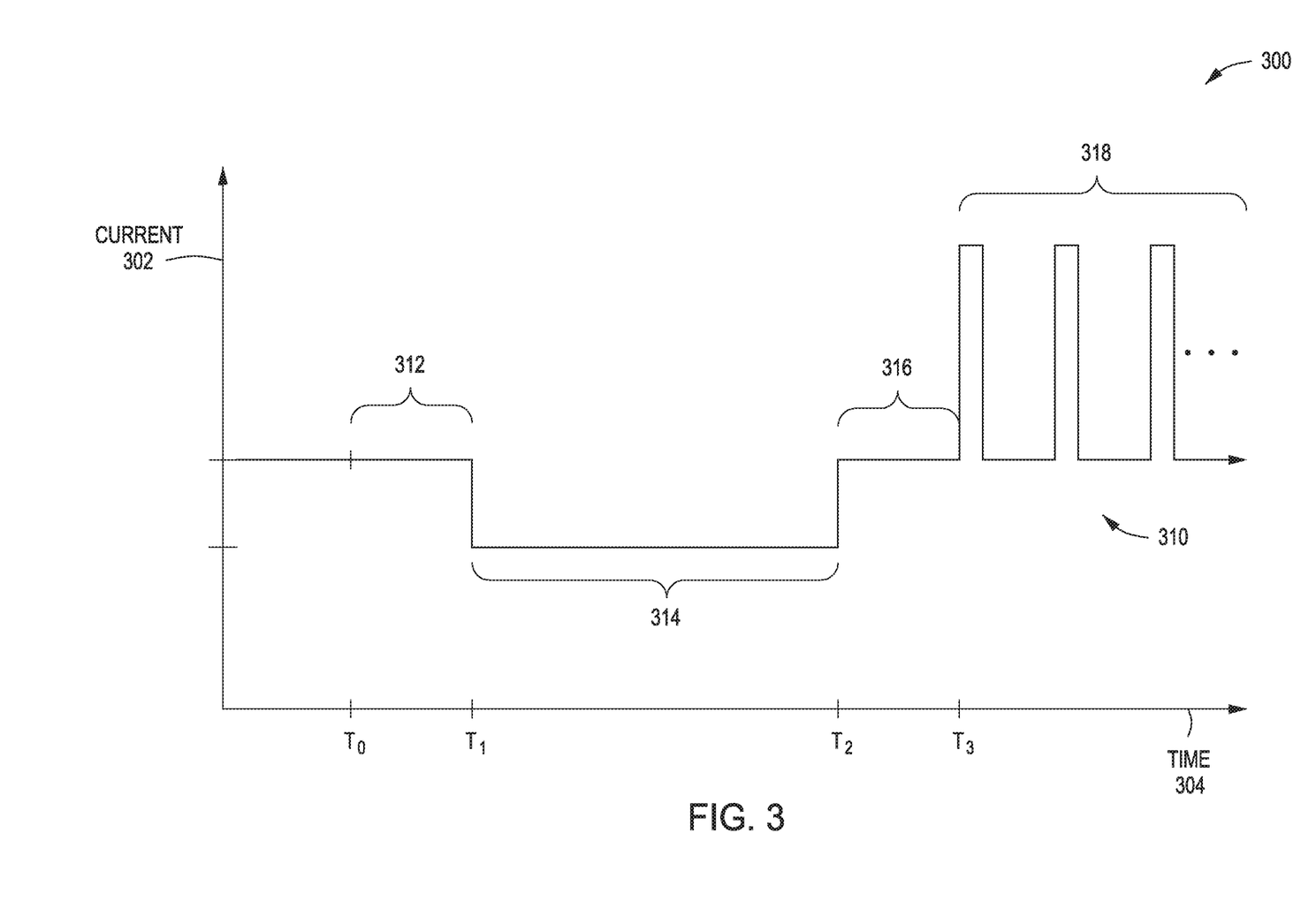
FIG. 3 illustrates a timing diagram of how a node in the wireless mesh network of FIG. 1 responds to an outage event, according to various embodiments of the present invention.

In one embodiment, a given node 130 may transmit a message when the node 130 suddenly loses power and will imminently go offline. A message of this type may be referred to in the art as a "last gasp" message. In such embodiments, the node 130 may include an energy resource (not shown) that allows the node 130 to operate for a period of time without external power. For example, the node 130 could include a capacitor, battery, or other form of energy storage. When the node 130 suddenly loses power, the node 130 may draw from the energy resource in order to transmit the "last gasp" message to server 154. Server 154 may collect many such last gasp messages and then perform various actions, including estimating the severity of a network-wide event, dispatching technicians to service offline nodes, and so forth. FIG. 3 illustrates how a node 130 may respond to an outage event.

FIG. 3 illustrates a timing diagram of how a node in the wireless mesh network of FIG. 1 responds to an outage event, according to various embodiments of the present invention. As shown, graph 300 includes current axis 302, time axis 304, and plot 310. Plot 310 represents the current consumed by a node 130 over time during and after a power outage event. Plot 310 is divided into intervals 312, 314, 316, and 318 that correspond to different operating modes of node 130 during the outage event.

During interval 312, node 130 detects that node power has been terminated, potentially indicating a power outage event. Node 130 may detect power termination between times t0 and t1 using a wide variety of techniques, although in one embodiment node 130 determines that zero-crossing events associated with a power source have stopped occurring. During interval 314, node 130 drops into low power mode and monitors the power source from time t1 to time t2. If an outage event has indeed occurred, node 130 confirms the event at or before time t2. During interval 316 node 130 ramps up to regular power mode in preparation for transmitting last gasp messages. Because node 130 cannot draw power from the external power source due to the outage event, node 130 relies on power from an internal source such as a capacitor or battery, as mentioned above. During interval 318, node 130 transmits multiple last gasp messages to an upstream neighbor. In practice, node 130 may transmit the last gasp messages to one or more pre-selected neighbors that reside closer to AP 150 than the node 130.

Referring generally to FIGS. 1-3, to transmit messages across wireless mesh network 102, such as the last gasp messages discussed above, nodes 130 may perform certain techniques avoid creating excessive network congestion. These techniques are specifically applicable to coordinating last gasp messages but more generally applicable to coordinating any type of transmissions, as described in greater detail below in conjunction with FIGS. 4A-5.

Coalescing Transmissions According to Network Layer

Figure 4A:
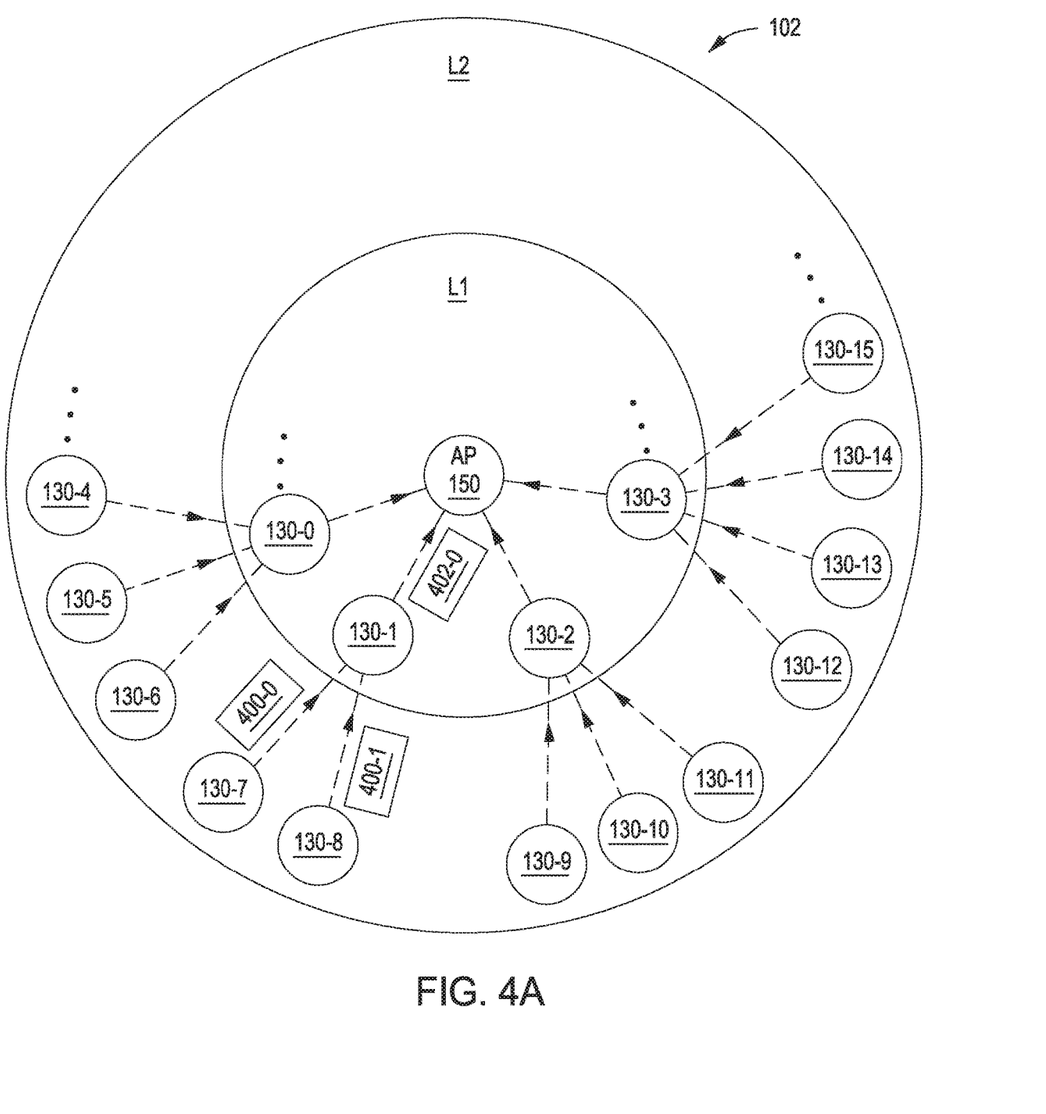
FIGS. 4A-4B illustrate how nodes in the wireless mesh network of FIG. 1 coalesce messages transmitted to an access point, according to various embodiments of the present invention.
Figure 4B:
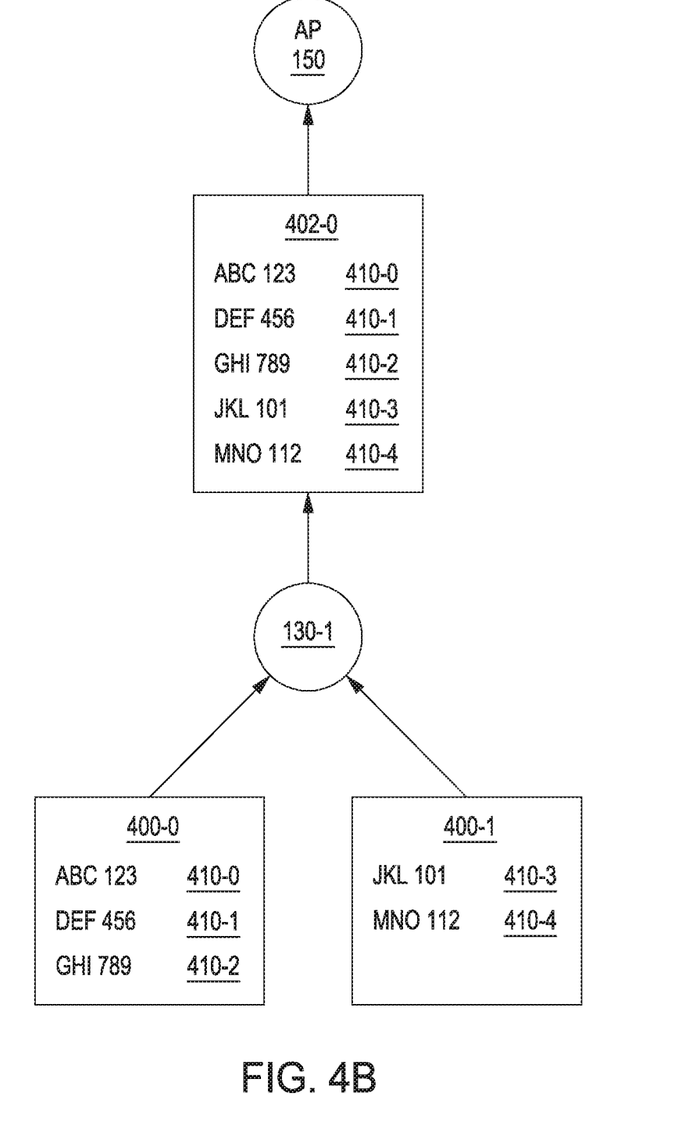

FIGS. 4A-4B illustrate how nodes in the wireless mesh network of FIG. 1 coalesce messages transmitted to an access point to reduce network congestion, according to various embodiments of the present invention.

As shown in FIG. 4A, wireless mesh network 102 is stratified into layers L1 and L2. Nodes 130-0 through 130-3 are included in layer L1, while nodes 130-4 through 130-15 are included in layer L2. A given node 130 is included within a particular layer based on the hopping distance between the node and AP 150. For example, each node 130 within layer L1 is exactly one hop away from AP 150, while each node within layer L2 is exactly two hops away from AP 150. Although depicted here with just one AP 150, wireless mesh network 102 may include multiple APs 150 and/or other continuously powered devices, such as relay nodes (none shown). In such configurations, a given node 130 is included within a particular layer based on the shortest hopping distance to any continuously powered device.

Nodes within layer L1 are configured to transmit inbound messages directly to AP 150. Nodes within layer L2, however, transmit inbound messages to AP 150 via intermediate nodes 130 within layer L1. Likewise, nodes 130 within layers beyond layer L2 (none shown) transmit inbound messages to AP 150 via intermediate nodes 130 that reside within each intervening layer. In the context of this disclosure, "inbound" message traverse wireless mesh network 102 towards AP 150, while "outbound" messages traverse wireless mesh network 102 away from AP 150.

As a general matter, each node 130 within wireless mesh network 102 is configured to operate as an intermediate node capable of relaying inbound messages to AP 150 on behalf of other nodes included in an adjacent outer layers. However, nodes 130 included in the outermost layer of wireless mesh network 102 need not operate as intermediate nodes. Nonetheless, such nodes can become intermediate nodes when additional nodes are added to the fringes of wireless mesh network 102.

Each intermediate node 130 within wireless mesh network 102 is configured to receive any number of inbound messages from nodes 130 in an adjacent outer layer. Upon receiving multiple inbound messages, a given intermediate node 130 combines the received messages into one longer message. The longer message includes some or all of the data included in the originally received messages. That data could be, for example, media access control (MAC) addresses, acknowledgement data, and so forth. The intermediate node 130 then transmits the longer message in an inbound direction to AP 150. This approach may improve the efficiency with which nodes 130 communicate with AP 150, as described by way of example below.

Suppose node 130-7 and node 130-8 in layer L2 transmit messages 400-0 and 400-1 to node 130-1 in layer L1, as is shown. With a conventional approach, node 130-1 would need to re-transmit both of those messages (and possibly others) to AP 150. AP 150 would then receive and process all such relayed messages. By contrast, when implementing the approach described herein, node 130-1 would instead combine message 400-0 and 400-1 to create message 402-0. Then, node 130-1 would transmit message 402-0 to AP 150. Accordingly, instead of AP 150 receiving two messages (messages 400-0 and 400-1), AP 150 receives only one message (message 402-0). Coalescing messages in this manner therefore reduces the amount of traffic across wireless mesh network 102, which helps to conserve bandwidth. In addition, because AP 150 processes fewer inbound messages, the processing load on AP 150 is reduced, and AP 150 may operate more efficiently. FIG. 4B depicts the above example of coalescing messages in greater detail.

As shown in FIG. 4B, node 130-1 receives messages 400-0 and 400-1. Message 400-0 includes MAC addresses 410-0, 410-1, and 410-2. Message 400-1 includes MAC addresses 410-3 and 410-4. Upon receipt of messages 400-0 and 400-1, node 130 concatenates messages 400-0 and 400-1 together to create message 402-0. Message 402-0 includes MAC addresses 410-0 through 410-4 and may also include the MAC address of node 130-1. Thus, instead of relaying both messages 400-0 and 400-1 to AP 150 (and possibly a separate last gasp message for node 130-1 itself), node 130-1 need only transmit message 402-0 in order to communicate each MAC address 410 to AP 150. Although this example involves transmitting MAC addresses to AP 150, persons skilled in the art will understand that messages including any type of data can be concatenated in this manner to reduce message traffic across wireless mesh network 102.

Referring generally to FIGS. 4A-4B, the message coalescing technique discussed above may be applied in a number of different contexts according to different embodiments. In one embodiment, when a power outage occurs, each node 130 transmits a last gasp message to AP 150 via one or more intermediate nodes. Each such last gasp message includes the MAC address of the transmitting node. Upon receiving a set of these last gasp messages, a given intermediate node 130 may incorporate those MAC addresses into a longer message in the manner discussed above. This process may repeat across successive layers of wireless mesh network 102. Accordingly, an intermediate node 130 in a given layer may receive multiple longer messages generated via the aforesaid coalescing technique, and then coalesce those messages to create a single, even longer message. This particular scenario is depicted in FIG. 4B, where node 130-1 receives messages 400-0 and 400-1 that already include multiple MAC addresses.

In the above embodiment, each node 130 may transmit last gasp messages at certain times so that intermediate nodes 130 can properly coalesce those messages. As a general matter, nodes 130 within an outer layer of wireless mesh network 102 transmit last gasp messages before nodes 130 in an inner layer. With this constraint, each node 130 in a given layer essentially waits until the nodes 130 in the adjacent outer layer have transmitted last gasp messages before coalescing those messages. In doing so, a given node 130 may buffer inbound messages for an interval of time and then coalesce those messages once the interval has elapsed. This approach may reduce the occurrence of failed last gasp transmissions.

In another embodiment, AP 150 may broadcast outbound messages to nodes 130 and then wait for acknowledgement messages transmitted by those nodes 130 in response to the outbound broadcast messages. In this scenario, the message coalescing technique described above can be applied to concatenate together acknowledgement messages, thereby reducing the number of acknowledgement messages that must be received and processed by AP 150.

Procedure for Coalescing Network Transmissions

Figure 5:
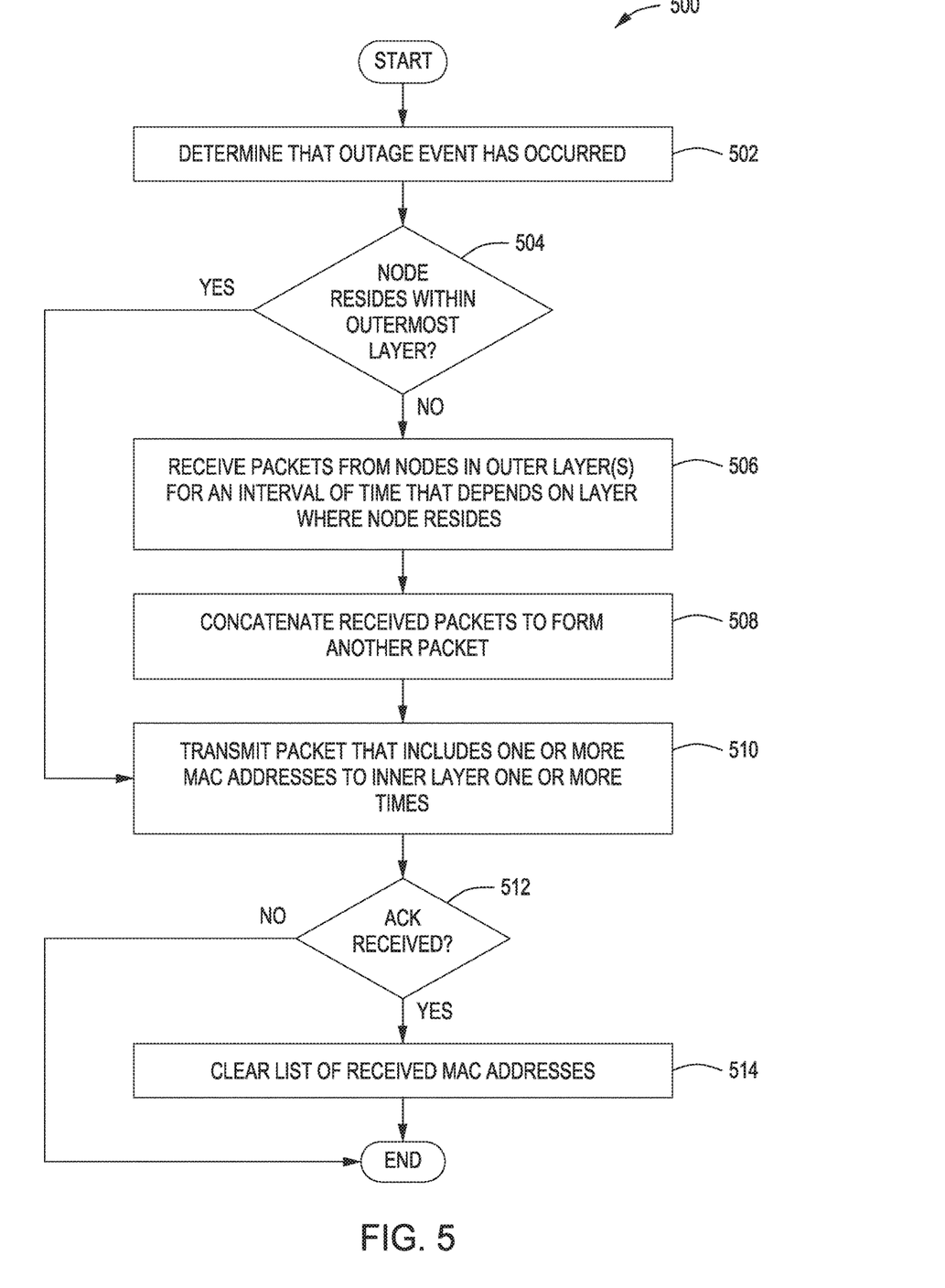
FIG. 5 is a flow diagram of method steps for coalescing message transmissions across a mesh network, according to various embodiments of the present invention.

FIG. 5 is a flow diagram of method steps for coalescing message transmissions across a mesh network, according to various embodiments of the present invention. Although the method steps are described in conjunction with the systems of FIGS. 1-4B, persons skilled in the art will understand that any system configured to perform the method steps, in any order, is within the scope of the present invention.

As shown, a method 500 begins at step 502, where a node 130 determines that a power outage event has occurred. In certain embodiments not related to power outages, step 502 may be skipped.

At step 504, node 130 determines whether the node resides within the outermost layer of wireless mesh network 102. If node 130 does reside in the outermost layer, the method 500 proceeds directly to step 510 and skips steps 506 and 508. Otherwise, if the node 130 does not reside in the outermost layer, the method 500 proceeds to step 506.

At step 506, node 130 receives one or more message packets from nodes in an adjacent outer layer for an interval of time that depends on the layer where the node resides. In operation, node 130 receives packets for a specific interval of time when packets are expected to be arriving from the adjacent outer layer. This interval of time may depend on the total size of wireless mesh network 102, the number of layers of the network, and other network parameters.

At step 508, node 130 concatenates the received message packets to form a larger message packet that includes data from each of the packets received at step 506. At step 510, node 130 transmits the packet generated at step 508, including data such as MAC addresses, to an adjacent inner layer. Node 130 may transmit the generated packet one or more times.

At step 512, node 130 determines whether an acknowledgement message was received in response to the message packet(s) transmitted at step 510. In some configurations, AP 150 transmits acknowledgement packets to nodes 130 in layer L1 in response to receiving message packets. In such cases, the nodes 130 in layer L1 may clear a buffer that includes message packets received from the adjacent outer layer. Thus, if node 130 determines at step 512 that an acknowledgement packet was received, then at step 514 node 130 clears the buffer of all such received MAC addresses. If an acknowledgement message is not received at step 512, the method 500 skips step 514.

In sum, a wireless mesh network is stratified into layers based on hop count between each node and an access point. In situations where many nodes transmit messages to the access point at approximately the same time, nodes within each layer buffer incoming messages from the adjacent outer layer and then combine these received messages into a larger message. The larger message is then transmitted to the adjacent inner layer, thereby reducing the number of messages that traverse the network.

At least one advantage of the technique described herein is that coalescing messages reduces the amount of traffic across the wireless mesh network, thereby conserving bandwidth. In addition, because the access point processes fewer inbound messages, that access point has a reduced processing load. Accordingly, the access point operates more efficiently and is less prone to becoming a network bottleneck or to failing.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for transmitting data across a mesh network, the method comprising:
   receiving, at a first node that resides within the mesh network, a first message transmitted to the first node by a second node that resides within a first portion of the mesh network;
   receiving, at the first node, a second message transmitted to the first node by a third node that resides within the first portion of the mesh network, wherein the third node is different than the second node;
   in response to receiving the first message and the second message, combining, at the first node, the first message and the second message to generate a third message; and
   transmitting, by the first node, the third message to an access point or a fourth node residing in a different portion of the mesh network.

2. The computer-implemented method of claim 1, further comprising determining a first interval of time for receiving the first message and receiving the second message based on a portion of the network where the first node resides.

3. The computer-implemented method of claim 1, further comprising determining that a power outage event occurred, wherein the first message and the second message comprise last gasp messages transmitted in response to the power outage.

4. The computer-implemented method of claim 1, further comprising determining that a broadcast message was received from the access point, wherein the first message and the second message comprise acknowledgement messages transmitted in response to the broadcast message.

5. The computer-implemented method of claim 1, wherein the first message includes a first address associated with the second node and a first set of addresses, and the second message includes a second address associated with the third node and a second set of addresses.

6. The computer-implemented method of claim 5, wherein the third message includes the first address, the first set of addresses, the second address, the second set of addresses, and a third address associated with the first node.

7. The computer-implemented method of claim 1, further comprising storing data associated with the first message and the second message in a buffer for an interval of time.

8. The computer-implemented method of claim 7, further comprising receiving an acknowledgement message from the access point indicating that the third message was received.

9. The computer-implemented method of claim 8, further comprising clearing the buffer in response to receiving the acknowledgement message.

10. A non-transitory computer-readable medium storing program instructions that, when executed by a processor, cause the processor to transmit data across a mesh network, by performing the steps of:
  receiving, at a first node that resides within the mesh network, a first message transmitted to the first node by a second node that resides within a first portion of the mesh network;
  receiving, at the first node, a second message transmitted to the first node by a third node that resides within the first portion of the mesh network, wherein the third node is different than the second node;
  in response to receiving the first message and the second message, combining, at the first node, the first message and the second message to generate a third message; and
  transmitting, by the first node, the third message to an access point or a fourth node residing in a different portion of the mesh network.

11. The non-transitory computer-readable medium of claim 10, wherein the first node resides within a second portion of the mesh network and transmits the third message to the access point within a third portion of the network, and wherein the second portion of the network resides between the first portion of the network and the third portion of the network.

12. The non-transitory computer-readable medium of claim 10, wherein the first node resides within a second portion of the mesh network and transmits the third message to the fourth node within a third portion of the network, and wherein the second portion of the network resides between the first portion of the network and the third portion of the network.

13. The non-transitory computer-readable medium of claim 10, further comprising determining that a power outage event occurred, wherein the first message and the second message comprise last gasp messages transmitted in response to the power outage.

14. The non-transitory computer-readable medium of claim 10, further comprising determining that a broadcast message was received from the access point, wherein the first message and the second message comprise acknowledgement messages transmitted in response to the broadcast message.

15. A system for transmitting data across a mesh network, comprising:
  a memory storing program instructions; and
  a processor coupled to the memory and configured to:
    receive, at a first node that resides within the mesh network, a first message transmitted to the first node by a second node that resides within a first portion of the mesh network,
    receive, at the first node, a second message transmitted to the first node by a third node that resides within the first portion of the mesh network, wherein the third node is different than the second node,
    in response to receiving the first message and the second message, combine, at the first node, the first message and the second message to generate a third message, and
    transmit, by the first node, the third message to an access point or a fourth node residing in a different portion of the mesh network.

16. The system of claim 15, wherein the processor, upon executing the program instructions, is configured to:
  receive the first message;
  receive the second message;
  generate the third message; and
  transmit the third message.

17. The system of claim 15, further comprising the first node that comprises the processor and the memory and is included within a second portion of the mesh network, wherein the second portion of the mesh network resides between the first portion of the mesh network and the different portion of the mesh network.

18. The system of claim 15, wherein the processor is further configured to determine that a power outage event occurred, wherein the first message and the second message comprise last gasp messages transmitted at substantially the same time in response to the power outage.

19. The system of claim 15, wherein the processor is further configured to determine that a broadcast message was received from the access point, wherein the first message and the second message comprise acknowledgement messages transmitted at substantially the same time in response to the broadcast message.

* * * * *